United States Patent [19]

Gazzarrini

[11] Patent Number: 4,871,206

[45] Date of Patent: Oct. 3, 1989

[54] DEVICE FOR HOLDING TEXTILE ARTICLES

[75] Inventor: Vinicio Gazzarrini, Florence, Italy

[73] Assignee: SOLIS S.R.L., Florence, Italy

[21] Appl. No.: 144,403

[22] Filed: Jan. 15, 1988

[30] Foreign Application Priority Data

Oct. 14, 1987 [IT] Italy .................................. 9509 A/87

[51] Int. Cl.⁴ .............................................. B66C 1/10
[52] U.S. Cl. ..................................... 294/99.1; 294/1.1
[58] Field of Search ................ 294/1.1, 61, 87.1, 99.1; 271/19, 30.1

[56] References Cited

U.S. PATENT DOCUMENTS 2,226,778 12/1940 Petroff ................................ 294/87.1
4,372,548 2/1983 Aurich et al. ..................... 294/61 X

FOREIGN PATENT DOCUMENTS 450764 11/1974 U.S.S.R. .............................. 294/86.4
1306882 4/1987 U.S.S.R. ............................... 294/1.1
1306883 4/1987 U.S.S.R. ............................... 294/1.1

Primary Examiner—Johnny D. Cherry
Assistant Examiner—Dean J. Kramer

[57] ABSTRACT

Device for individually holding textile articles, comprising a structure supporting a plurality of holding elements 6 shaped like coils or plates disposed side-by-side and axially movable, and piston operated levers for moving the holding elements away from and close to each other as they come in contact with the fabric of the article to be picked up.

The holding elements may advantageously consist of coils of a tensile spring shaped as a cylindrical helix which is suitably extended, before coming in contact with the fabric, by the piston operated levers, and then is released for resilient contraction movement upon its contact with the fabric.

Advantageously, the device comprises controls of the correct holding of the article, thereby allowing the automation of the device for the use thereof in the handling of textile materials.

4 Claims, 4 Drawing Sheets

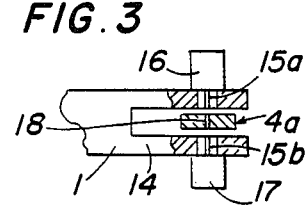
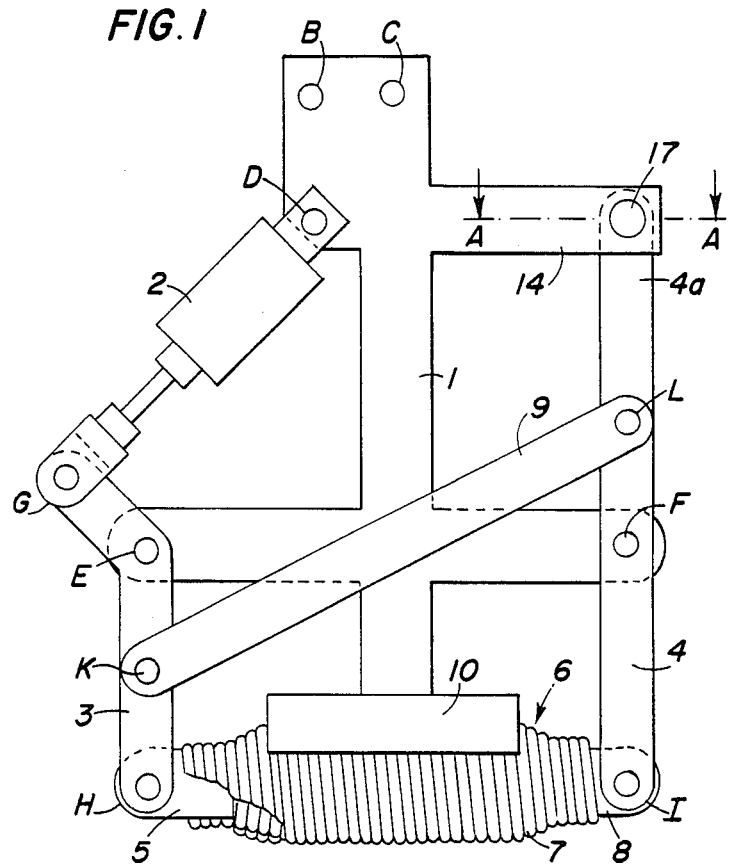
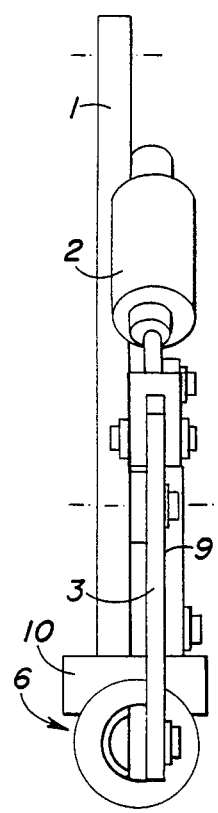

DEVICE FOR HOLDING TEXTILE ARTICLES

FIELD AND BACKGROUND OF THE INVENTION

The present invention relates to devices for holding textile articles.

The devices presently known for holding fabrics or similar materials, besides being unsuitable to grip the article without changing it, are above all incapable of overcoming the difficulties related to the automatic picking of pieces made of very light and thin fabric, one at a time, from a stack. In fact, the pneumatic and mechanical systems so far known do not solve this problem in a reliable and repeatable way for the following reasons among others: the former fail because they are unsuitable for air-permeable fabrics as the air passing through them may suck more than one piece, and the latter utilizes pins which may pierce through them and thus may grasp more than one thickness of fabric. In particular, such devices are not suited for very thin fabrics as for stockings and pantyhoses.

Another drawback encountered with the known devices consists in stretching out, by acting from the outside, a flattened tubular fabric, a basic operation in the manufacturing of stockings and pantyhoses which poses a problem, when using these devices, equivalent to the one taking place when picking up a single piece at a time from a stack.

SUMMARY AND OBJECTS OF THE INVENTION

The present invention has the object of providing a holding device which eliminates the drawbacks of similar devices presently known, and allows in a reliable and repeatable way, the automatic picking up, from one side only, of a textile article from a stack of pieces made of even very thin and light fabric.

This result has been achieved in accordance with the invention by realizing a device for the holding of textile articles, which comprises structure supporting a plurality of holding means shaped as coils or plates side-by-side disposed on a same axis and movable thereon, and means for moving away, that is withdrawing, said elements prior to their hold and then moving said elements close to each other, that is approaching them, when they are in contact with the fabric of the article to be picked up.

These holding elements may, for example, make up the coils of a tensile spring which, in active position, is suitable extended by the withdrawal means while it is released by said means upon the contact with the fabric, to allow the hold thereof.

Advantageously, the device comprises means for the control of the correct hold of the article, thus allowing the automation of the device for its use in the handling of textile materials.

Such a device may advantageously be applied to the arm of a commercial robot or a robot especially designed for the textile industry and used as a mechanical hand for handling textile materials, by utilizing, in this case, also the techniques of artificial vision allowing, for example, the selection and picking up of details from a mixed assembly of products being at standstill or in motion.

The various features of novelty which characterize the invention are pointed with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

BRIEF DESCRIPTION OF THE DRAWINGS

In the drawings:

FIG. 1 shows a front view of a first embodiment of the holding device according to the invention, in resting attitude;

FIG. 2 shows a side view of the holding device of FIG. 1;

FIG. 3 shows a detail of the control means for the hold performed by the device of FIG. 1;

DESCRIPTION OF THE PREFERRED EMBODIMENT

Figure 4:
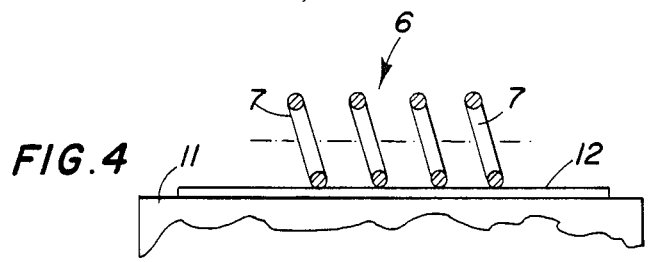
FIG. 4 shows a detail of FIG. 1 before the holding of the fabric.

With reference to FIG. 1 of the attached drawings, the device for holding textile articles according to the invention comprises a cross-shaped support structure 1 on which two points B and C are provided for its fastening to a handling device (for example a robot arm), and three points D, E and F for the pivoting connection, in the cross plane, respectively to an end of a pneumatic cylinder 2, and to an intermediate point of one of the two levers 3 and 4. These points B to F make up the fixed points of the holding device, points B, C and D being disposed close to the upper part of the cross, and points E and F to each end of the same horizontal bar. At the upper end, the lever 3 is pivoted in G to the other end of the pneumatic cylinder 2 and, at the lower end, in H to a first element 5 for the fixing of an end of a tensile spring 6 shaped as a cylindrical helix with a plurality of coils 7 having circular cross-section The other end of the spring 6 is fixed to a second fixing element 8 pivoted in I to the lower end of lever 4. Points E. F. H and I are selected so that the distances E-H and F-I are equal. A centering rod 9 is pivoted at one end, to the lever 3 in a point K which is intermediate to points E and H and, at the other end, to the lever 4 in a point L disposed above the fixed point F so that the distances E-K and F-L are equal. At the lower end of the vertical bar of cross 1, an element 10 is provided whose internal concave surface is intended to receive the spring 6 and makes up a stop therefore during the holding operation which will be described later on.

Figure 5:
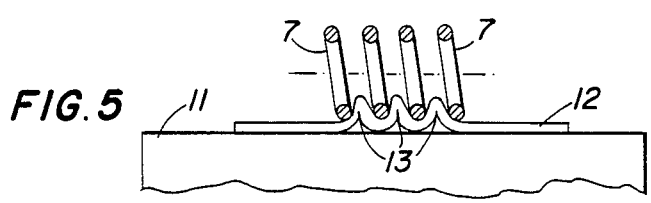
FIG. 5 shows the detail of FIG. 4 after the holding of the fabric.

The utilization of the device of FIG. 1 and, more generally, the operating principle of a holding device according to the present invention, and with further reference to FIGS. 4 and 5 of the attached drawings is as follows. At the beginning of the holding operation, the device is in the position shown in FIG. 1, the coils 7 of spring 6 being in close contact to one another and the stem of the pneumatic cylinder 2 being in forward position. When the cylinder 2 is activated by per se known means, the stem upon its withdrawal, causes point H of lever 3 to be moved on the left, that is, away from the device vertical axis. During this movement, rod 9 acts as a self-centering device for the spring by causing lever 4 to perform an angular displacement equal to that of FIG. 3 but in opposite direction. These movements of levers 3, 4 result in the stretching of spring 6 and thus in the withdrawal of coils 7 from each other in a symmetrical way with respect to the device vertical axis.

The device, which is kept by the cylinder 2 with the spring 6 in an "open" position, is placed with spring 6 resting on a plane 11, onto which the textile article 12 to be picked up is laid, so that coils 7 of the spring press on a fabric article 12.

The pneumatic cylinder is then deactivated in order to make the stem move forward thereby progressively releasing the spring which is compressed. When the coils of the spring move close to one another, the fabric, not being retained at its ends and moving together with the spring to the points of contact therewith, re-enters between adjacent coils of the spring thus forming some cusps 13 which have a development corresponding to the coils pitch of the spring in its open condition. In this holding position, the article is well retained and can be handled without any risk of being released by the spring.

Figure 6:
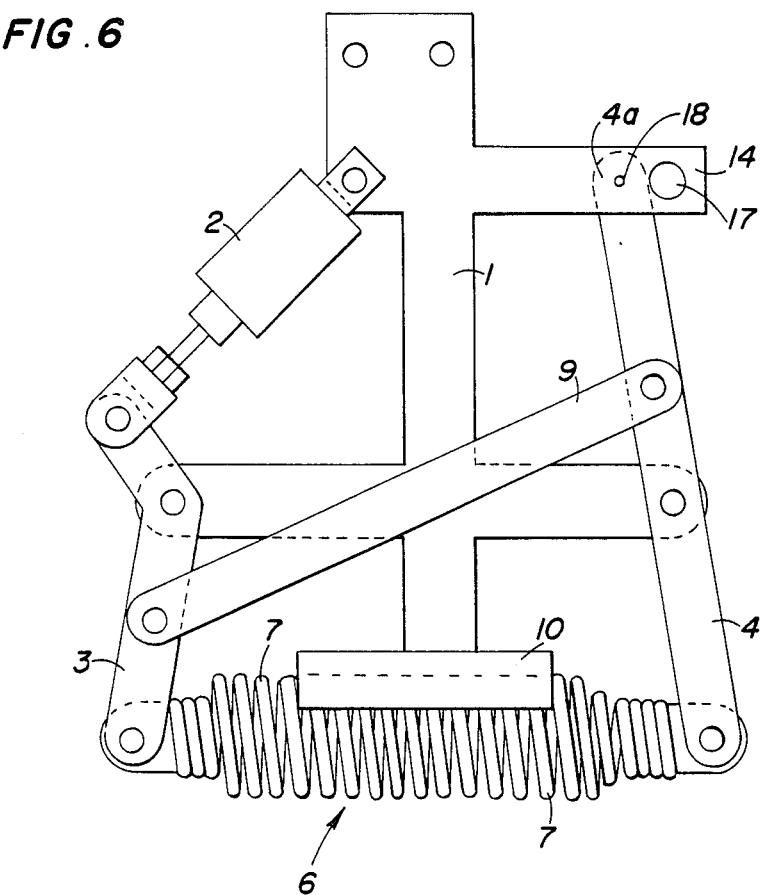
FIG. 6 shows the device of FIG. 1 in active phase, before the holding of a fabric.

FIG. 3 shows a section of a detail, not described yet, of the device of FIG. 1, which represents an exemplary embodiment for the spring hold control. To this end, the structure 1 is provided, in the vicinity of its upper end, with a lateral projection 14 which terminates with a fork in which the extended end 4a of the lever 4 passes and is free to move therethrough. On the arms of the fork in correspondence of holes 15a and 15b being provided one opposite to the other, a beam emitter 16 and receiver 17 are respectively fixed, so that the luminous beam transmitted by the former to the latter is able to go through a hole 18 provided in the end 4a of lever 4 when the device is in its initial position. Elements 16 and 17 make up a system for the hold control, which system delivers a signal when the hole 18 is not lined up with the beam transmitted to the receiver 17 by the emitter 16 to signal that the holding of the fabric has taken place after the closing of spring 6. In fact, if the fabric is not held between the coils, the spring is completely compressed and lever 4 goes back to the initial resting position with the hole 18 lined up with the beam between 16 and 17, and the control system does not emit any signal. Instead, when the fabric of article 12 is gripped by the spring 6, the hole 18 is moved on the left (see FIG. 6), the lever 4 intercepts the beam and the control system emits the hold signal.

Figure 7:
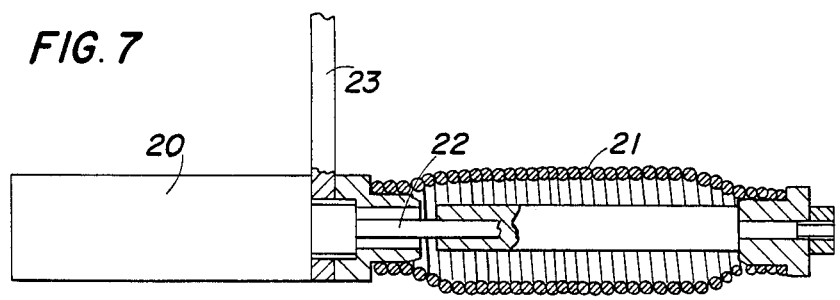
FIG. 7 shows the side view, partly in section, of a second embodiment of the holding device according to the invention.
Figure 8:
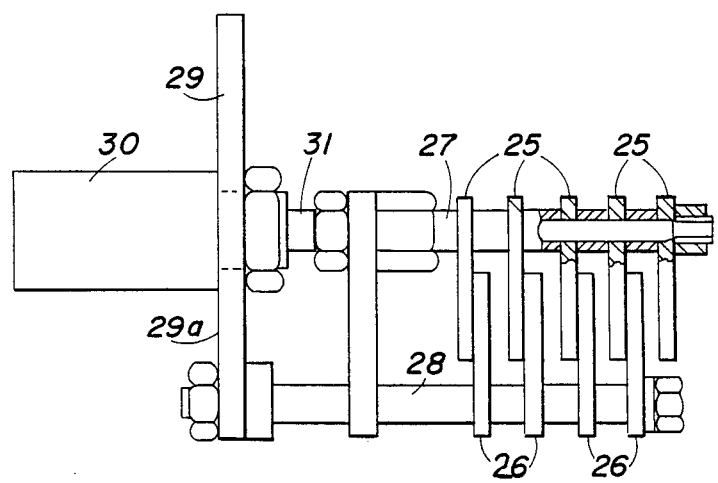
FIG. 8 shows the front view, partly in section, of a further embodiment of the holding device according to the invention.
Figure 11:
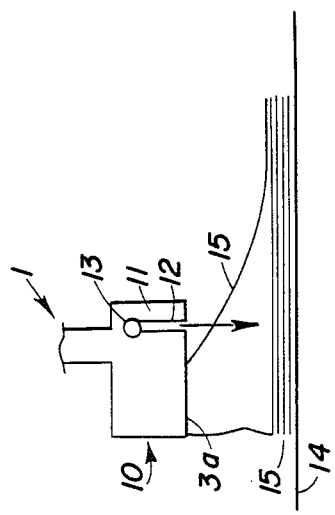
FIG. 11 shows the side view of the device of FIG. 10.
Figure 10:
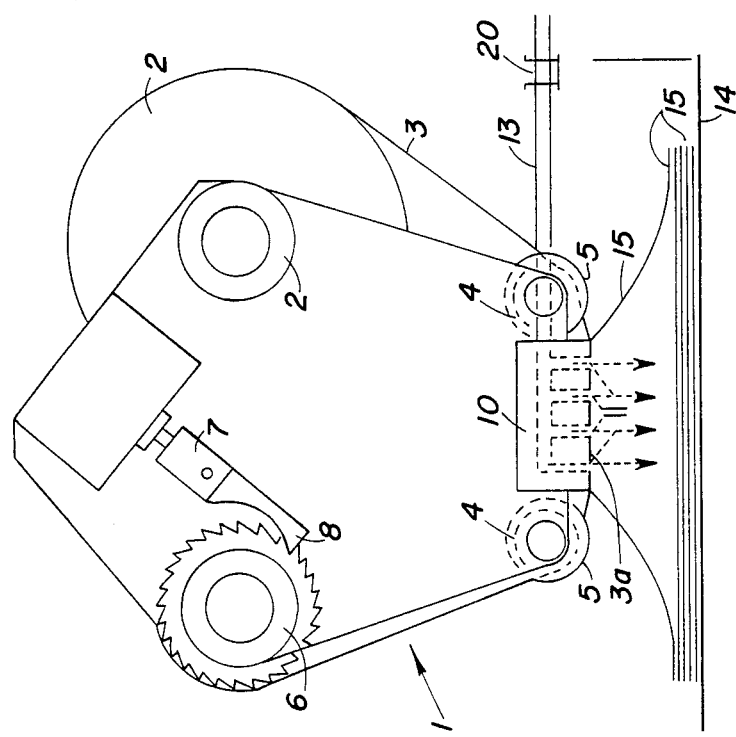
FIG. 10 shows the front view of a holding device according to the invention, soon after the holding of a pantyhose.

Such a system, therefore, allows complete automation of the device according to the invention and, although not shown in FIGS. 7 and 8 for the sake of simplicity, it is easily adaptable to the embodiments herein illustrated. This photocell operated control system may also be replaced by an equivalent static or electromechanic system.

Figure 9:
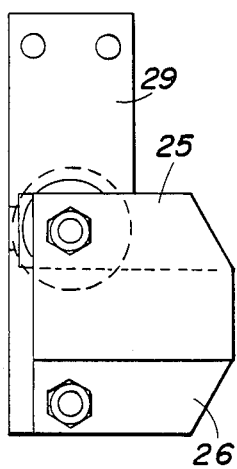
FIG. 9 shows the side view of the device of FIG. 8.

FIG. 7 of the attached drawings illustrates a simplified version of the holding device of FIG. 1. This device comprises a support element 23 which is transversely fixed to a pneumatic cylinder 20 on whose stem 22a spiral spring 21 having more coils than spring 6 is mounted coaxial with an end solid with the support 23 and the other with the free end of stem 22. In this way, when the cylinder 20 is activated and the stem moves forward, the spring stretches out moving the coils away from each other, while when the cylinder 20 is deactivated, the spring is automatically compressed. The operation of this device is like the one previously described FIGS. 8 and 9 show a further embodiment of the holding device according to the invention, wherein the spring has been replaced by two assemblies of like plates 25 and 26, fixed side-by-side and axially spaced apart along two corresponding parallel rods 27 and 28 to an extent greater than their thickness and in such position that each plate 25 will be juxtaposed to a corresponding plate 26. The rod 28 is transversely fixed to a projection 29a of a supporting element 29 and rod 27 is fixed to the stem 31 of a pneumatic cylinder 30 transversely fixed to the supporting element 29.

By activating and deactivating the pneumatic cylinder 30, there is obtained the approach or withdrawal of each plate 25 with respect to the corresponding plate 24 and thus the hold and release of one fabric element on which the free ends of plates 25, 26 have been pressed. These plates may be coated with rubber, in their terminal part, in order to advantageously improve their holding capability.

The springs and the plates of the described devices may be made of metallic material, plastic material, of synthetic rubber or other suitable material, and the springs may be realized with a wire of circular or polygonal cross-section.

Referring to drawings 10 and 11, a device for the temporary holding of hosiery fabrics, especially tubular, is shown including: a holding device 1 with adhesive, made up, in operative order: of a coil 2 on which a usual adhesive tape 3 is wound on one side only; of a spring 9 for the friction of coil 2 able to ensure the proper tension of the adhesive tape 3 during the holding; of two tape-guiding rollers 4, within the groove of which the tape 3 passes and cannot come out therefrom owing to the presence of lateral edges 5 which project from the periphery of the rollers, of a drum 6 for the rewinding of the used tape, the intermittent movement of which being obtained by means of a pneumatic device 7 provided with a pawl 8; of a block 10 interposed between said tape-guiding rollers 4 to allow the horizontal support of the zone of tape 3 intended to provide the holding of the article;

A body 11 solid with block 10 and laterally displaced with respect to the holding zone 3a of the adhesive tape, which is provided with a plurality of vertical nozzles 12 communicating with a common duct 13 for the supply of compressed air drawn from an external compressor.

A horizontal support 14, for a plurality of like articles 15, equally oriented in a predetermined position and in overlapping relationship to form a stack located below the holding device with adhesive, and interlocked to a vertical alternate movement intermittently performed from and towards said holding device 1 after the holding of each article 15.

According to the invention, the number, disposition and inclination of the nozzles 12 with respect to the holding surface of article 15 may widely vary in relation to the type of yarn and stitch utilized for the article fabric.

The compressed air flows from said nozzles 12 soon after the holding of each article by the adhesive tape 3 and during at least a fraction of the next phase for the moving away of the article towards the support 14, it is understood that the flow of compressed air to the nozzles 12 is activated and respectively cut off, by a solenoid valve 20 inserted on the supply duct 13 and associated to a timer, whose intervention is synchronized with the movements of the articles holding device 1 and support 14.

The operation is as follows. The tape holding surface 3a is brought in contact, through, a slight pressure, with the upper face of the flat textile article 15 which is on top of the stack of articles present on the support 14, following the upwards displacement of the support 14; after which, as soon as the downwards movement of support 14 has begun and while the upper face of the tubular article 15 is retained by the holding zone 3a of the adhesive tape, the nozzles 12 flow out as many thin jets of compressed air which, by filtering through the stitches of the fabric, acts upon the lower face of the tubular article thereby causing the stretching out of the elastic edge.

It is understood that in place of the coil and the adhesive tape other systems may be utilized, such as a belt ring-mounted and with its external surface spread with liquid glue supplied through a fixed tank with the aperture turned downwards and a felt for the closing of the tank in contact with the belt; the tank may also be replaced by a block of stick glue or by a drop device with brush in contact with the belt.

Practically, the construction details may vary in whatever equivalent way as for the form, dimensions, elements, disposition, nature of materials employed are concern, without nevertheless coming out from the scope of the solution idea adopted and, therefore, remaining within the limits of the protection granted by the present patent for industrial invention.

What is claimed is:

1. A device for picking up and holding porous textile articles, comprising: a holder having a holding end and an opposite textile engaging end, said holder including a support structure having a lever pivotally mounted on each side thereof, a tension spring pivotally connected between said levers at said textile engaging end, which spring is engageable with the article to be picked up, and means connected to said levers for pivoting said levers to stretch such spring, said spring comprising a coil spring having adjacent coils which are spread by said levers and engage and hold the material therebetween upon release of said levers.

2. A device according to claim 1 including means associated with said levers to indicate the position of at least one of said levers and thereby to indicate when said levers are positioned to relax said spring and whether they have entrained an article between the coils thereof.

3. A device according to claim 1 wherein portions of adjacent coils at one outer surface of the coil spring engage and hold the material, stop means being provided on the support and receiving an opposite surface of the coil spring.

4. A device according to claim 1 including means for self-centering the spring with respect to the support during the stretching of the spring.

* * * * *